US007610209B2

(12) United States Patent  (10) Patent No.: US 7,610,209 B2
Stanton                    (45) Date of Patent:    Oct. 27, 2009

(54) METHOD AND APPARATUS FOR PROVIDING SUPPLEMENTAL INSURANCE FOR LEASED VEHICLES

(76) Inventor: Owen D. Stanton, 25 Terry La., Commack, NY (US) 11725

( * ) Notice: Subject to any disclaimer, the term of this patent is extended or adjusted under 35 U.S.C. 154(b) by 1091 days.

(21) Appl. No.: 10/317,268

(22) Filed: Dec. 10, 2002

(65) Prior Publication Data

US 2004/0111330 A1    Jun. 10, 2004

(51) Int. Cl.
G06Q 40/00 (2006.01)
(52) U.S. Cl. ............................................. 705/4; 705/35
(58) Field of Classification Search ...................... 705/4
See application file for complete search history.

(56) References Cited

U.S. PATENT DOCUMENTS

| 4,736,294 | A | * | 4/1988 | Gill et al. ....................... 705/38 |
| 5,852,808 | A |   | 12/1998 | Cherny |
| 6,018,714 | A |   | 1/2000 | Risen, Jr. et al. |
| 6,023,687 | A |   | 2/2000 | Weatherly et al. |
| 6,182,048 | B1 |  | 1/2001 | Osborn et al. |
| 6,272,471 | B1 |  | 8/2001 | Segal |
| 6,347,302 | B1 | * | 2/2002 | Joao ........................... 705/36 R |
| 2002/0152115 | A1 | * | 10/2002 | Morita et al. .................. 705/13 |
| 2002/0177926 | A1 | * | 11/2002 | Lockwood et al. ............. 701/1 |

FOREIGN PATENT DOCUMENTS

WO    WO 02/059808 A2 *  8/2002

OTHER PUBLICATIONS

Davenport, Don't let your insurer make you feel a crash dummy, Sep. 8, 2001, The Daily Telegraph, p. 08.*
Timoteo, A total loss, Canadian Underwriter; Aug. 2002; 69, 8; ABI/INFORM Global, p. 70.*
Davenport, Don't let your insurer make you feel a crash dummy, Sep. 8, 2001, The Daily Telegraph, p. 08.*
Arizona Republic, Know the terms for successful auto leasing, Sep. 3, 1998, Edition: Final Chase, Section: Special Section, p. AL4.*
Williams, Risk Management and Insurance, 1976, McGraw-Hill Book Company, Third Edition, p. 491, 505-506.*
Crane, Insurance Principles and Practices, 1980, John Wiley & Sons, Inc., p. 383, 387.*
Vaughan, Fundamentals of Risk and Insurance, 1978, Second Edition, p. 89.*
Riegel, Insurance principle and practices, 1921, Prentice-Hall, Inc, p. i-xv, 1-27.*
"A Model for the Determination of "Fair" Premiums on Lease Cancellation Insurance Policies", The Journal of Finance, vol. XI, No. 5, Dec. 1980 (pp. 1439-1457).

* cited by examiner

Primary Examiner—C. Luke Gilligan
Assistant Examiner—Tran Nguyen
(74) Attorney, Agent, or Firm—Daniel P. Burke & Associates, PLLC

(57) ABSTRACT

Methods of the present invention are designed to offer insurance to lessees of vehicles to cover up front, out-of-pocket lease expenses in the event of a total loss, e.g., theft, and preferably include steps performed by a vehicle leasing dealer as well as steps performed by one or more participating insurers. The steps are preferably performed with the aid of computing devices which are in communication. When the lease is prepared, the relevant information about the lease and the lessee is submitted by the lease dealer to the participating insurers. The insurers determine the cost of supplemental insurance based on this information and, if the cost is acceptable, offer insurance coverage to the lessee.

8 Claims, 2 Drawing Sheets

METHOD AND APPARATUS FOR PROVIDING SUPPLEMENTAL INSURANCE FOR LEASED VEHICLES

The invention relates to methods and apparatus for providing insurance coverage. More particularly, the invention relates to methods and apparatus for providing supplemental insurance for leased vehicles.

BACKGROUND

One of the most commonly leased types of vehicles is the motor vehicle and, in particular, consumer motor vehicles. Leasing a motor vehicle can involve a significantly lower monthly payment as compared to financing the purchase of the same motor vehicle. Nevertheless, most automotive leases typically require significant cash payments at the time the lease is signed.

Insurance coverage for purchased vehicles may cover the value of the vehicles at the time of total loss or may cover the cost of replacement. Insurance coverage for leased items, typically covers the replacement value of the leased item to the owner and the lessee is relieved of further lease obligations. This can be insufficient for the lessee to replace a leased vehicle because of significant out of pocket expenses incurred when a lease is first signed.

SUMMARY OF THE INVENTION

Aspects of the present invention provide methods and apparatus for providing supplemental insurance for leased vehicles.

Other aspects of the present invention provide methods and apparatus for providing supplemental insurance for leased vehicles which reimburses the up front, out-of-pocket expenses of the lease.

One preferred method of the present invention includes steps performed by an automotive leasing dealer as well as steps performed by one or more participating insurers. The steps are preferably performed with the aid of computers coupled to each other by a wide area network (WAN) or other connection. When the lease is prepared, the relevant information about the lease and the lessee is submitted by the lease dealer to the participating insurers. The insurers determine the cost of supplemental insurance based on this information and, if the cost is acceptable, offer insurance coverage to the lessee. If supplemental insurance is offered, the lease dealer presents the option(s) to the lessee. If the lessee chooses one of the insurance options, the lease is calculated with the cost of the supplemental insurance. The insurance premium is collected and the policy is issued with the lease. If no insurance offer is made or if the lessee declines the offer(s), the lease is prepared without the cost of supplemental insurance.

DETAILED DESCRIPTION

Figure 1:
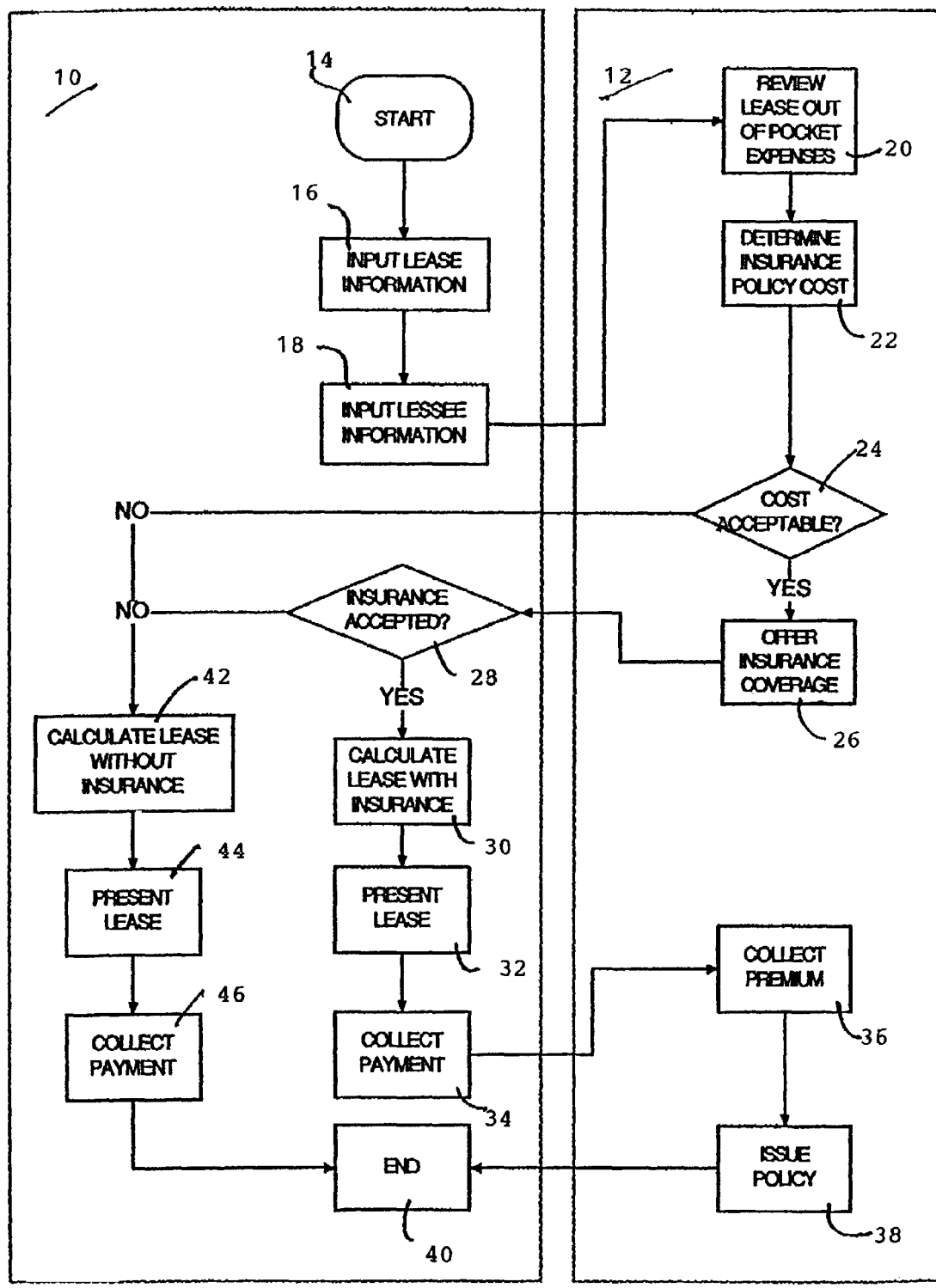
FIG. 1 is a schematic flow chart illustrating methods according to the invention.

Referring to FIG. 1, the method of one preferred embodiment of the present invention preferably include steps 10 performed by an automotive leasing dealer as well as steps 12 performed by one or more participating insurers. The method starts 14 when the lease is prepared. The relevant information about the lease is entered by the dealer 16 and the relevant information about the lessee is entered by the dealer 18. This information is supplied to at least one and preferably to more than one insurer so that multiple bids can be obtained.

The insurer(s) review the information 20 and determine the cost of supplemental insurance 22 based on this information. The insurer(s) decide whether the risk is acceptable 24. If the cost of the policy is determined to be acceptable 24, insurance coverage is offered 26.

If supplemental insurance is offered 26, the lease dealer presents the option(s) to the lessee 28. If the lessee chooses one of the insurance options, the lease is calculated with the cost of the supplemental insurance 30 and the lease is presented 32. The up front cost of the lease, including the cost of the supplemental insurance is preferably collected by the dealer 34. The dealer then forwards the insurance premium or guarantees the premium to the selected insurer as shown by the link from 34 to 36. Applicable regulations may require that the premium be forwarded directly to the insurance company or agent by the lessee in order to be binding on the insurance company.

The insurer collects the insurance premium or premium guarantee 36 and issues the policy 38. The process ends where the lessee is presented with the insurance policy 40.

If no insurance offer is made because the cost is determined to be unacceptable at 24 or if the lessee declines the offer(s) at 28, the lease is prepared 42 without the cost of supplemental insurance. The lease is presented to the lessee 44 and the up front cost of the lease is collected 46. The process ends 40.

From the present description, those skilled in the art will appreciate that the information obtained regarding the lease at 16 in FIG. 1 should likely include the type of vehicles being leased, the value of the vehicles, the length of the lease, the monthly lease payments, etc. The information obtained regarding the lessee 18 in FIG. 1 should likely include information which the insurer finds useful in determining the risk of total loss. For example, the age and gender of the lessee may well be relevant in determining the risk of loss. In the case of an automotive lease, the lessee's driving record may also be relevant.

Figure 2:
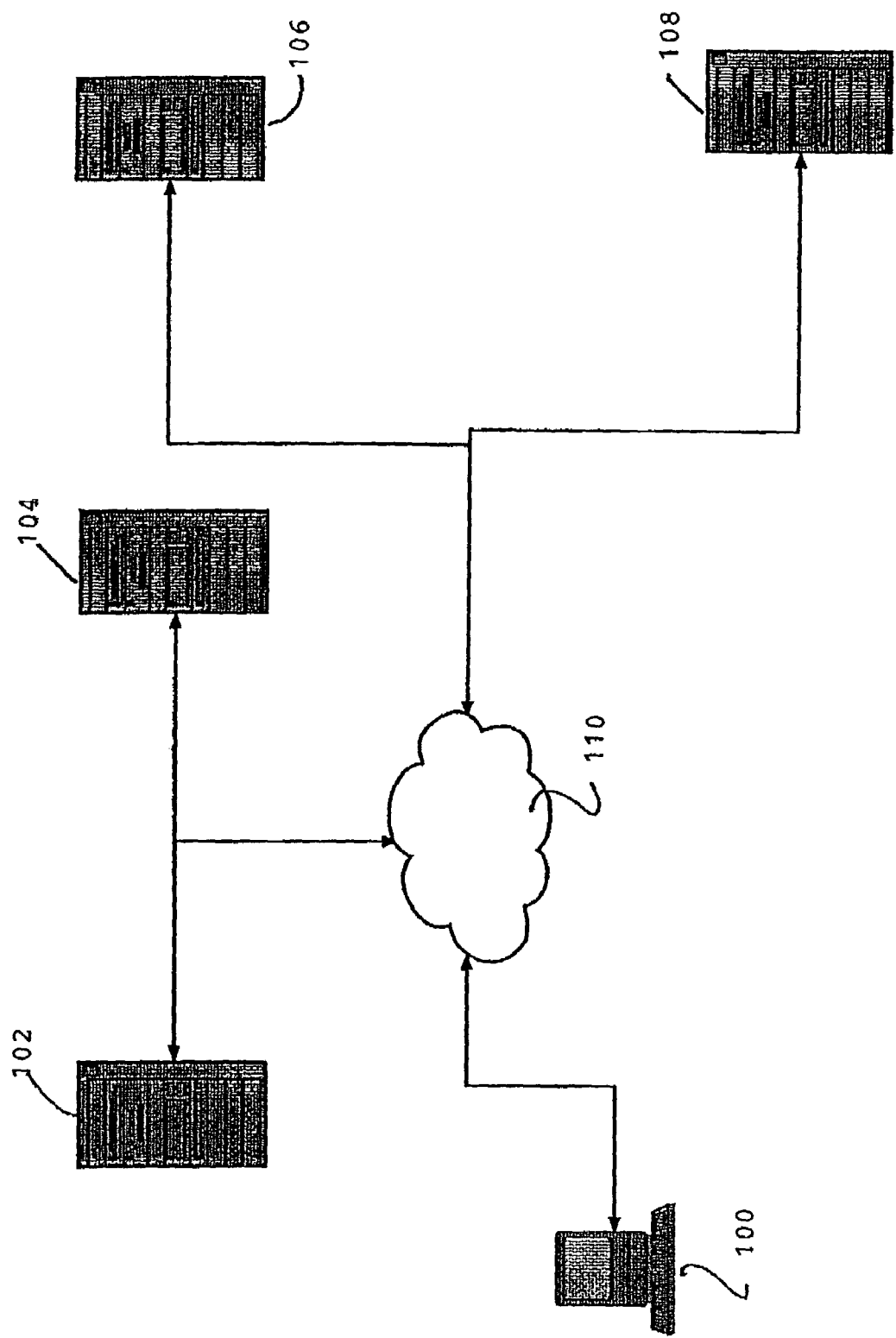
FIG. 2 is a schematic diagram of a computer network utilized to perform the methods of the invention.

As illustrated in FIG. 2, the methods of the invention are preferably implemented with a plurality of computing devices coupled to a wide area network. For example, a computer 100 located at a dealer is coupled to a plurality of computers 102, 104, 106, 108 located at different insurers via a network 110. The connection with the different computers is preferably virtually simultaneous so that requests for bids may be processed quickly. Alternatively, the dealer computer 100 may connect to a single sever computer which then communicates with the insurer computers. The insurer computers may be programmed to automatically respond to information submitted by a dealer. Alternatively, the insurer computers may be manually operated by underwriting personnel who make decisions in real time.

Although the preferred apparatus for performing the methods of the invention include separate dealer and insurer computers, the methods can be performed by a single dealer computer pre-programmed with insurer information. For example, one or more insurers may provide a dealer with risk analysis software which performs the insurer method steps on the dealer's computer. Still another apparatus for performing the methods of the invention include written instructions for determining whether to offer insurance and how much the premium should cost based on lease variables and readily determined data regarding the lessee. The written instructions may be provided by the insurer to the dealer for use by the dealer or may be used by underwriting personnel at the offices of the insurer in response to communication (e.g. telephone call) from the dealer.

The methods and apparatus of the present invention provide many advantages for lease dealers, insurers, and lessees. Lease dealers can offer a new service which gives them a competitive edge over other lease dealers. In addition, the lease dealers may be able to earn additional income by acting as agent for the insurer if insurance regulations permit. The insurer can increase income by offering an additional and desirable product. The lessee can obtain assurance that in the event of a total loss of the leased vehicles, it can be replaced with identical vehicles without repeating the expense of the up front costs of the lease. The up front costs which can be insured in the event of total loss of the leased vehicle include the lessees: (1) down payment (capitalized cost reduction); (2) tax on the down payment; (3) a single payment lease amount when the total lease expense is paid as a single up front payment; (4) tax on a single payment lease amount; (5) a security deposit; (6) bank fees; and (7) state sales tax.

The invention claimed is:

1. A method for providing supplemental lease insurance to a lessee of a vehicle to cover at least one up front cost of the lease in the event of a total loss of said leased vehicle, said method comprising:
   providing a computer processing system comprising:
      at least one computer processor for processing data;
      a storage medium for storing data;
      a user interface for receiving relevant information of a lease, said relevant information comprising at least one up front cost of said lease;
   collecting relevant information regarding the vehicle lease;
   collecting at least one up front cost for a vehicle lease;
   identifying a total loss as a triggering event;
   determining a payout amount based on said at least one up front cost with said computer processing system; and,
   in response to said triggering event, making a payment to said lessee for said payout amount.

2. The method according to claim 1 wherein said user interface is located at a location remote from said computer processor.

3. The method according to claim 2 further comprising:
   the step of communicating said relevant information to a plurality of computer processors located at a respective plurality of insurers.

4. The method according to claim 3 further comprising:
   communicating at least one offer from a lease dealer to the lessee.

5. A method of providing supplemental lease insurance according to claim 2 wherein said vehicle is an automobile.

6. The method according to claim 2 wherein said remote location is at a lease dealer.

7. A method of providing supplemental lease insurance according to claim 1 further comprising the step of collecting a premium for said supplemental lease insurance.

8. A method of providing supplemental lease insurance according to claim 1 wherein said vehicle is an automobile.

* * * * *